United States Patent
Rosenberg et al.

(10) Patent No.: US 7,710,403 B2
(45) Date of Patent: May 4, 2010

(54) SLIDE PAD MEMBRANE

(75) Inventors: Paul K. Rosenberg, Sunnyvale, CA (US); Jonah A. Harley, Mountain View, CA (US); Paul M. Welch, Cupertino, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 1067 days.

(21) Appl. No.: 11/114,460

(22) Filed: Apr. 26, 2005

(65) Prior Publication Data

US 2006/0238514 A1  Oct. 26, 2006

(51) Int. Cl.
G09G 5/00 (2006.01)

(52) U.S. Cl. .................... 345/173; 345/157; 345/176; 178/18.01

(58) Field of Classification Search ............... 345/157, 345/173, 156, 176, 184; 455/556.2, 557.4; 379/102.01; 360/246.2; 702/155
See application file for complete search history.

(56) References Cited

U.S. PATENT DOCUMENTS

| 5,287,121 A | 2/1994 | Louis et al. |
| 6,088,023 A | 7/2000 | Louis et al. |
| 6,094,190 A | 7/2000 | Kodim |
| 6,243,080 B1 | 6/2001 | Molne |
| 6,326,948 B1 | 12/2001 | Kobachi et al. |
| 6,351,657 B2 | 2/2002 | Yamada |
| 6,508,137 B2 | 1/2003 | Suzuki |
| 6,650,314 B2 | 11/2003 | Philipson |
| 7,187,360 B2 * | 3/2007 | Suzuki et al. ............... 345/160 |
| 7,348,967 B2 * | 3/2008 | Zadesky et al. ............ 345/173 |
| 2004/0212586 A1 | 10/2004 | Denny |

FOREIGN PATENT DOCUMENTS

CN    2286867    7/1998

* cited by examiner

*Primary Examiner*—Abbas I Abdulselam

(57) ABSTRACT

A slide pad membrane is provided. The slide pad membrane comprises an annular ring having an inner edge, a center portion having an outer edge, and a plurality of concentric annular ripples including an outer annular ripple connected to the inner edge of the annular ring and an inner annular ripple connected to the outer edge of the center portion.

19 Claims, 4 Drawing Sheets

SLIDE PAD MEMBRANE

BACKGROUND

Various input devices exist for navigating a pointer in a display. Examples of such devices include a mouse, a joystick, and a touchpad. These devices receive inputs from a user and, in conjunction with a host, translate the inputs to move the pointer within the display. The input devices may also have a selection mechanism such as a button to allow the user to perform functions in the display.

Each type of input device may serve a useful function in allowing a user to interact with a host device. Because of design constraints of a host such as a mobile telephone, a particular input device may not be suited for a particular host or type of user interaction with the host. For example, size limitations of a host may prevent the use of certain types of input devices. It would be desirable to provide an input device that provides as much functionality as possible for a host.

SUMMARY

One exemplary embodiment provides a slide pad membrane. The slide pad membrane comprises an annular ring having an inner edge, a center portion having an outer edge, and a plurality of concentric annular ripples including an outer annular ripple connected to the inner edge of the annular ring and an inner annular ripple connected to the outer edge of the center portion.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

As described herein, a slide pad system with a slide pad membrane is provided. A user moves a center portion of the slide pad membrane in two directions (e.g., the x and y directions) to adjust a pointer location in a display device of a host and applies pressure to the center portion of the slide pad membrane in a third direction (e.g., the z direction) to cause one or more functions to be performed. Control circuitry determines position information based on the movement of elements in contact with the slide pad membrane in the first two directions, and determines a click state and finger pressure based on the applied pressure in the third direction. The control circuitry provides the position information and click state to a host.

Figure 1A:
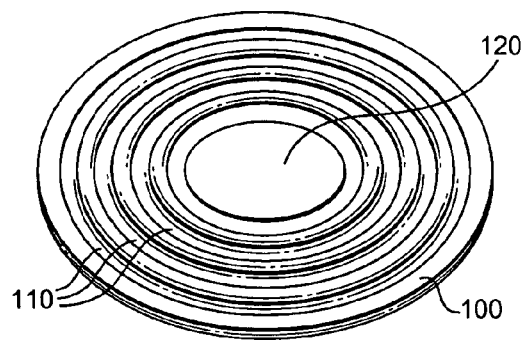
FIGS. 1A-1C are diagrams illustrating various perspectives of one embodiment of a slide pad membrane.
Figure 1B:
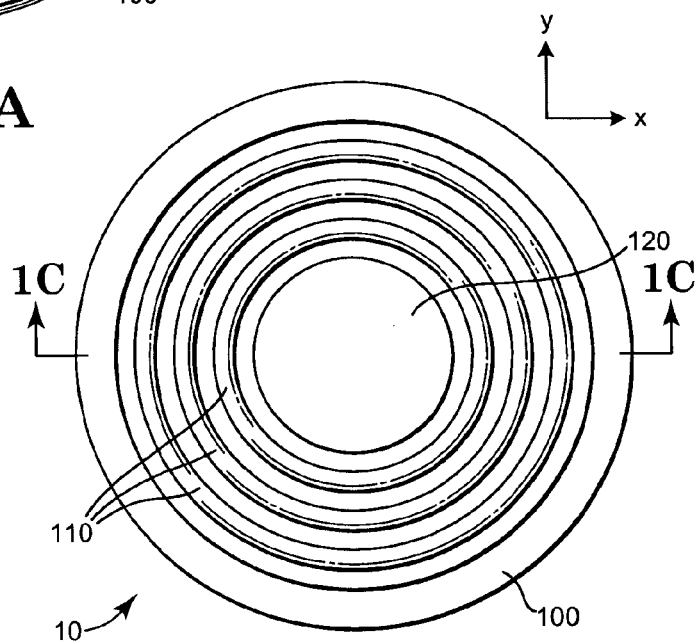
Figure 1C:
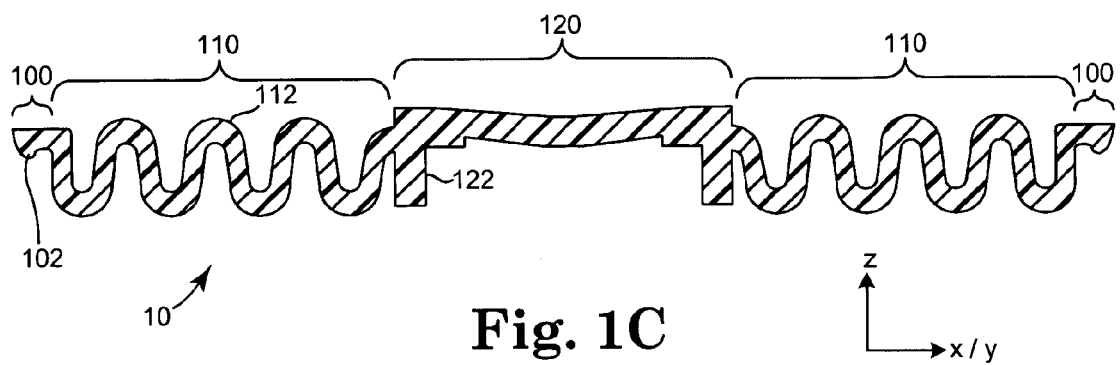

FIGS. 1A-1C are diagrams illustrating various perspectives of one embodiment of a slide pad membrane 10. FIG. 1A illustrates a perspective view of slide pad membrane 10. Slide pad membrane 10 includes a portion 100 that forms an annular ring, a portion 110 that forms a plurality of concentric annular ripples, and a center portion 120 that forms a substantially circular disk.

FIG. 1B illustrates a top view of slide pad membrane 10 in the x and y plane. As shown in FIG. 1B, the annular ring of portion 100 has an inner edge that connects to the outer edge of the outermost annular ripple of the portion 110. The inner edge of the innermost annular ripple of portion 110 connects to the outer edge of the disk of portion 120.

FIG. 1C illustrates a cross-section view of slide pad membrane 10 in the z and x/y plane. As shown in FIG. 1C, the concentric annular ripples of portion 110 form a radially symmetric spring to bias the disk in portion 120 toward a center of the annular ring of portion 100 in the x/y plane. The concentric annular ripples of portion 110 allow the disk of portion 120 to be moved in any direction toward the annular ring of portion 100 in the x/y plane. The concentric annular ripples also bias the disk in portion 120 toward a neutral position in the z direction. The concentric annular ripples allow the disk of portion 120 to move up and down in the z direction, i.e., the direction orthogonal to the x/y plane that includes the annular ring of portion 100.

Figure 3:
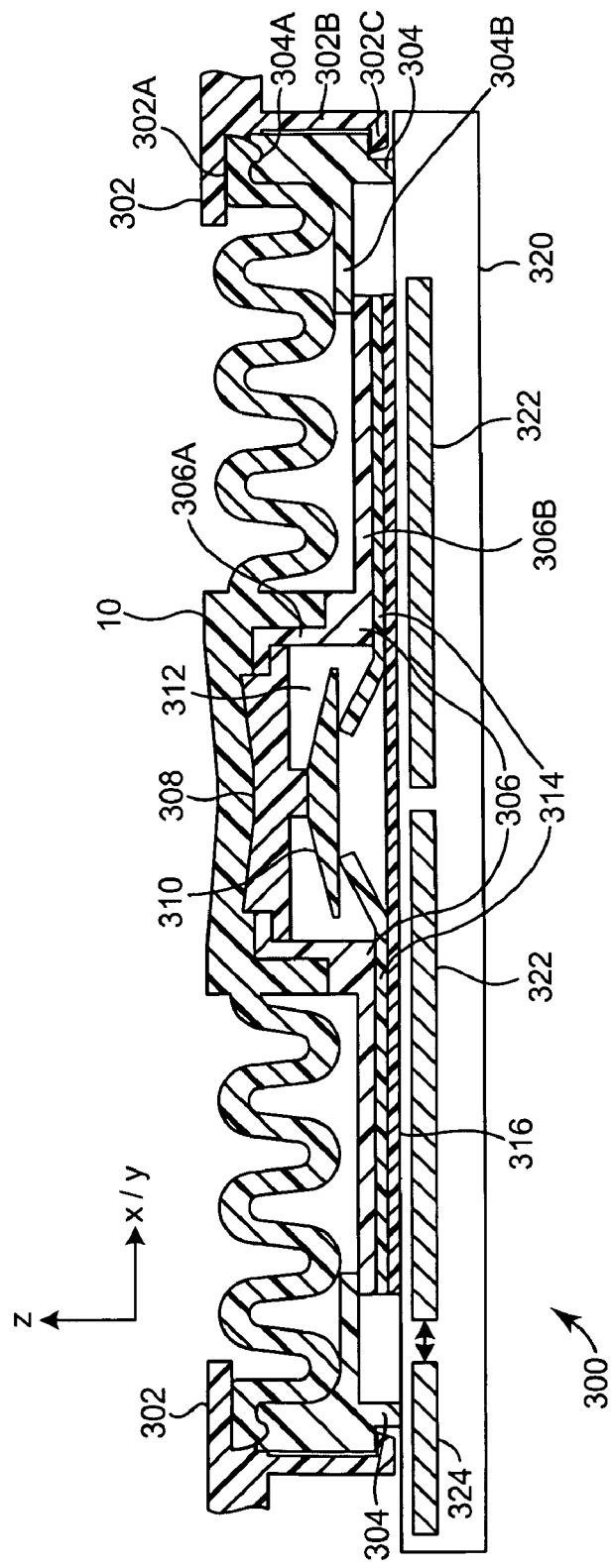
FIG. 3 is a diagram illustrating one embodiment of a slide pad system with a slide pad membrane.

The annular ring of portion 100 includes an O-ring 102 configured to interface with a case portion 302 as shown in FIG. 3. In the embodiment shown in FIG. 1C, each of the concentric annular ripples 112 of portion 110 has a cross-section that is substantially sinusoidal. A cylindrical portion 122 extends from the disk portion to form a cavity for interfacing a button 308 as shown in FIG. 3 and a guide structure such as a guide ring 306 as shown in FIG. 3.

In one embodiment, slide pad membrane 10 is formed using a compression or injection molding process. In other embodiments, slide pad membrane 10 is formed using other processes.

In one embodiment, slide pad membrane 10, including portions 100, 110, and 120, is integrally formed and has a substantially uniform material composition (e.g., an elasticized polymer, silicon, or rubber). In other embodiments, portions 100, 110, and 120 may be separately formed prior to being combined and/or may have one or more diverse material compositions.

In one embodiment, one or more of portions 100, 110, and 120 of slide pad membrane 10 are transparent or translucent to allow a selected amount light to pass through slide pad membrane 10.

Figure 2A:
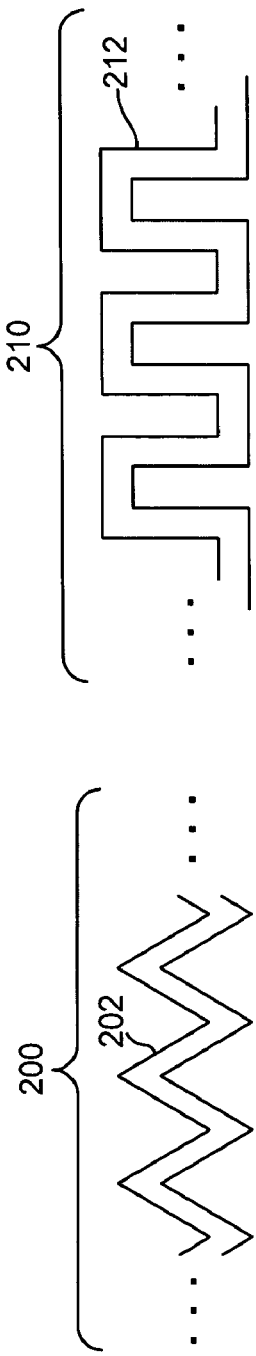
FIGS. 2A-2B are diagrams illustrating embodiments of a portion of a slide pad membrane.

FIG. 2A is a diagram illustrating one embodiment of a portion 200 of a slide pad membrane. Portion 200 forms a plurality of concentric annular ripples where each ripple 202 forms a substantially triangular cross-section. In one embodiment, portion 200 replaces portion 110 of slide pad membrane 10 such that the outer edge of the outermost annular ripple 202 of portion 200 connects to the inner edge of the annular ring of portion 100 and the inner edge of the innermost annular ripple 202 of portion 200 connects to the outer edge of the disk of portion 120.

Figure 2B:
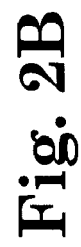

FIG. 2B is a diagram illustrating one embodiment of a portion 210 of a slide pad membrane. Portion 210 forms a plurality of concentric annular ripples where each ripple 212 forms a substantially square cross-section. In one embodiment, portion 210 replaces portion 110 of slide pad membrane 10 such that the outer edge of the outermost annular ripple 212 of portion 210 connects to the inner edge of the annular ring of portion 100 and the inner edge of the innermost annular ripple 212 of portion 210 connects to the outer edge of the disk of portion 120.

In other embodiments, portion 110 may be replaced with portions that include concentric annular ripples with other or varied cross-sections. In addition, the concentric annular ripples may be uniformly or variably spaced relative to one another. Further, one or more of the concentric annular ripples may have a different size in the z direction relative to other of the annular ripples. Still further, one or more of the concentric annular ripples may have a different material composition compared to other of the annular ripples.

FIG. 3 is a diagram illustrating one embodiment of a slide pad system 300 with slide pad membrane 10. Slide pad system 300 interfaces with a case top 302 and a case bottom 304 of a host device (e.g., a host 600 shown in FIG. 5). In the embodiment of FIG. 3, a top surface of portion 100 of slide pad membrane 10 interfaces with a bottom surface 302A of case top 302, and a bottom surface that includes O-ring 102 of portion 100 interfaces with a v-groove 304A of case bottom 304. Case top 302 includes a cylindrical portion 302B that extends along a cylindrical surface of case bottom 304. An annular notch 302C that extends from cylindrical portion 302B interfaces with case bottom 304 to allow case bottom to be snapped into place in case top 302 thereby securing slide pad membrane 10.

A guide ring 306 includes a cylindrical portion 306A that interfaces with cylindrical portion 122 of slide pad membrane 10 and forms a cavity 312. A disk portion 306B of guide ring 306 extends from cylindrical portion 306A in the x/y plane. A disk portion 304B of case bottom 304 extends in the x/y plane to overlap with disk portion 306B of guide ring 306 to fix the movement of guide ring 306 in the positive z direction. In response to movement of the disk portion 120 of slide pad membrane 10 in the x/y plane, disk portion 306B slides along disk portion 304B in the x/y plane.

In the embodiment shown in FIG. 3, disk portion 304B has a straight cross section. In other embodiments, disk portion 304B may be formed with a curved or angled cross section in order to provide a force on disk portion 306B in the negative Z direction. The force causes disk portion 306B and sliding surface 316 to remain flat and in contact with a printed circuit board (PCB) 320 over the entire contact area between sliding surface 316 and PCB 320.

A dome actuation button 308 attaches to a bottom surface of the disk portion 120 of slide pad membrane 10 and interfaces with cylindrical portion 306A of guide ring 306 in cavity 312. In response to movement of the disk portion 120 of slide pad membrane 10 in the x/y plane, button 308 moves with guide ring 306 in the x/y plane. In response to movement of the disk portion 120 of slide pad membrane 10 in the z plane, button 308 slides along cylindrical portion 306A in cavity 312 in the z plane.

A dome actuation switch 310 is contained in cavity 312 and generates an audible and tactile click in response to being depressed in the z direction by a user using disk portion 120 of slide pad membrane 10. Switch 310 interfaces with button 308 and moves with guide ring 306 and button 308 in the x and y plane in response to movement of the disk portion 120 of slide pad membrane 10 in the x/y plane. Switch 310 moves down with button 308 in the z plane in response to downward movement of the disk portion 120 of slide pad membrane 10 in the z plane. Switch 310 moves up as a result of the spring force provided by a spring/sense plate 314, and by relaxation of its buckling deformation.

Spring/sense plate 314 attaches to guide ring 306 (e.g., with a clip mechanism, adhesive or soldering), and, in addition to serving as a spring for lifting switch 310, serves as a conductive sense plate for the capacitive measurements of x, y, and z displacement. Spring/sense plate 314 provides a restoring force to switch 310 in the positive z direction, and provides a change in measured capacitance as the electrically conductive portions of spring/sense plate 314 move toward capacitive sense electrodes 322 of PCB 320. A smooth, low-friction dielectric 316 is attached (e.g. with adhesive) to spring 314 to set the space between the part of spring/sense plate 314 that does not move in the z direction and electrodes 322 on PCB 320. Spring/sense plate 314 also serves to ensure a smooth sliding feel and comprises a relatively soft composition to reduce wear on PCB 320.

PCB 320 is disposed in close proximity to spring/sense plate 314. PCB 320 includes capacitive sense electrodes 322 and control circuitry 324. In one embodiment, control circuitry 324 senses capacitances between capacitive sense plates 322 and spring/sense plate 314 to generate position and click state information of slide pad system 300.

In another embodiment, flex circuitry or thin wires may be used to make direct electrical connections to spring/sense plate 314 and facilitate the capacitive measurement of x, y and z position. Direct wire connect reduces noise and allows easy rejection of stray capacitance. Running multiple wires, one to sense plate 314 and another to dome switch 310 allows measurement of the finger forces on button 308 that are easily decoupled from the position measurement of sense plate 314.

In another embodiment, the position of spring/sense plate 314 may be measured optically (with an optical mouse sensor, for example).

In another embodiment, the position of spring/sense plate 314 may be measured magnetically (with a permanent magnet and hall effect sensors, for example).

In operation, slide pad system 300 provides information to host 600 (shown in FIG. 5) in response to inputs from a user. The user provides the inputs by moving disk portion 120 of slide pad membrane 10 in the x and/or y directions. By moving disk portion 120 in the x and/or y directions, the user also moves guide ring 306, button 308, switch 310, spring/sense plate 314, and dielectric 316 in the x and/or y directions. Control circuitry 324 of converts the inputs in the x and/or y directions to position information and provides the position information to host 600 to cause a pointer (e.g., a cursor) to be adjusted in a display device of host 600. The user also provides inputs by applying pressure to disk portion 120 in the z direction. By applying pressure to disk portion 120 in the z direction, the user moves disk portion 120, button 308, switch 310, and part of spring/sense plate 314 in the z direction. Slide pad system 300 converts the inputs in the z direction to a click state and finger pressure information and provides the click state to host 600 to cause one or more functions to be performed by host 600.

The concentric annular ripples of portion 110 of slide pad membrane 10 operate to bias the disk of portion 120 toward a center of the annular ring of portion 100 in the x and y directions. A user moves the disk of portion 120 by applying sufficient pressure on the disk in the x and/or y direction to overcome the resistance of the annular ripples. When the resistance of the annular ripples exceeds the x and/or y direction pressure applied to the disk by the user (e.g., when the user releases the x and/or y direction pressure on disk portion 120), the annular ripples cause the disk to return to or toward the center position in the x and y directions.

Dome switch 310 and springs 314 operate to bias the disk toward a slightly elevated position in the z direction. The user causes functions of the host to be performed by applying and/or releasing pressure on the disk in the z direction to activate and deactivate dome switch 310. For example, the user may apply and release pressure on the disk any number of times to cause one or mores clicks of varying durations to be performed using dome switch 310. When the resistance of dome switch 310 and springs 314 exceeds the z direction pressure applied to the disk by the user (e.g., when the user releases the z direction pressure on the disk), dome switch 310 and springs 314 cause the disk to return to or toward the center position in the z direction.

Control circuitry 324 measures the amount of movement of the disk in the x, y, and z directions using capacitive circuitry 322. From the measurements in the x and y directions, control circuitry 324 generates position information and provides the position information to host 600 (shown in FIG. 5) to cause the host to adjust the position of a pointer in a display device 602 (shown in FIG. 5). From the measurements in the z direction, control circuitry 324 generates the click state and provides the click state to the host to cause the host to perform one or more functions.

Figure 4A:
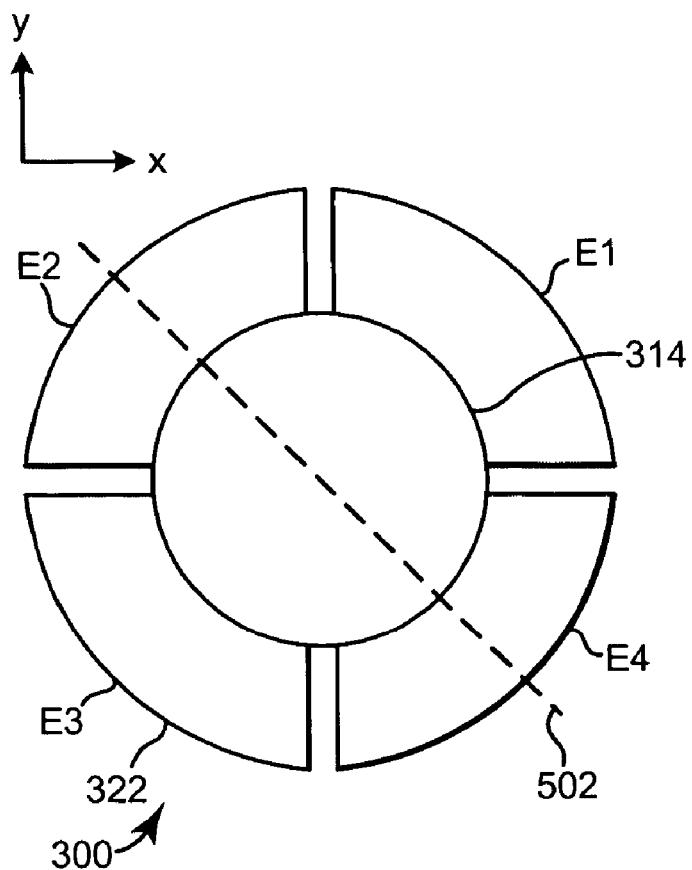
FIGS. 4A-4B are diagrams illustrating one embodiment of capacitive sensing electrodes.
Figure 4B:
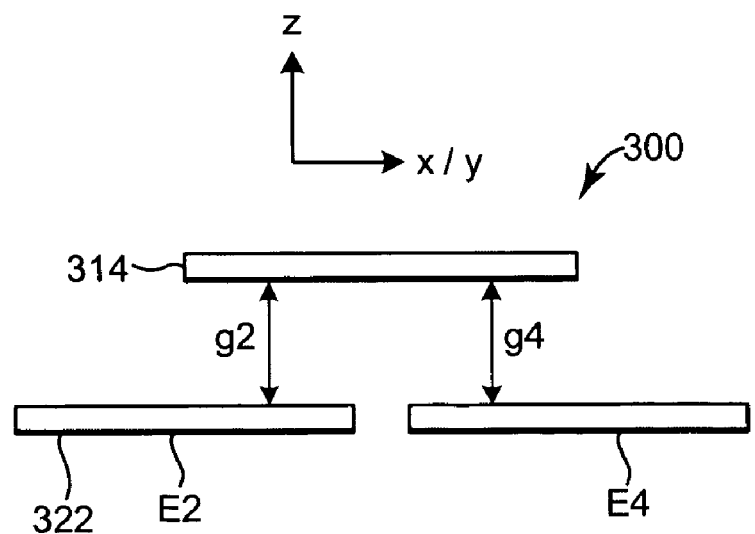

FIG. 4A is a diagram illustrating a top view of one embodiment of a layout of capacitive sensing electrodes 322 in slide pad system 300. Slide pad system 300 includes spring/sense plate 314 that is moved by the user in the x and y directions with respect to electrodes E1, E2, E3, and E4 using the disk of portion 120 of slide pad membrane 10. FIG. 4B is a diagram illustrating a cross-section view of one embodiment of slide pad system 300 along an axis 502 shown in FIG. 4A.

As shown in the cross-section in FIG. 4B, electrodes E2 and E4 are set in a first plane formed in the x and y directions. Electrodes E1 and E3 are also set in the first plane (not shown in FIG. 4B). Spring/sense plate 314 is set in a second plane formed in the x and y directions such that the second plane is displaced from the first plane as indicated by a gap g2 between spring/sense plate 314 and E2 and a gap g4 between electrodes 406 and E4. Control circuitry 324 generates position information in response to the position of electrode E6 with respect to electrodes E1, E2, E3, and E4 by measuring the capacitances between electrodes E1, E2, E3, and E4 and spring/sense plate 314.

In one embodiment, slide pad membrane 10 forms a moisture and/or particle seal between the exterior and interior of case top 302.

Case top 302, case bottom 304, guide ring 306, and dome actuation button 308 may each be formed by any suitable process such as plastic or metal injection molding or metal stamping process. Dome actuation switch 310 may be formed by any suitable process such as a metal stamping process. Spring 314 may be formed by any suitable process such as a metal etching or metal stamping and forming process.

Figure 5:
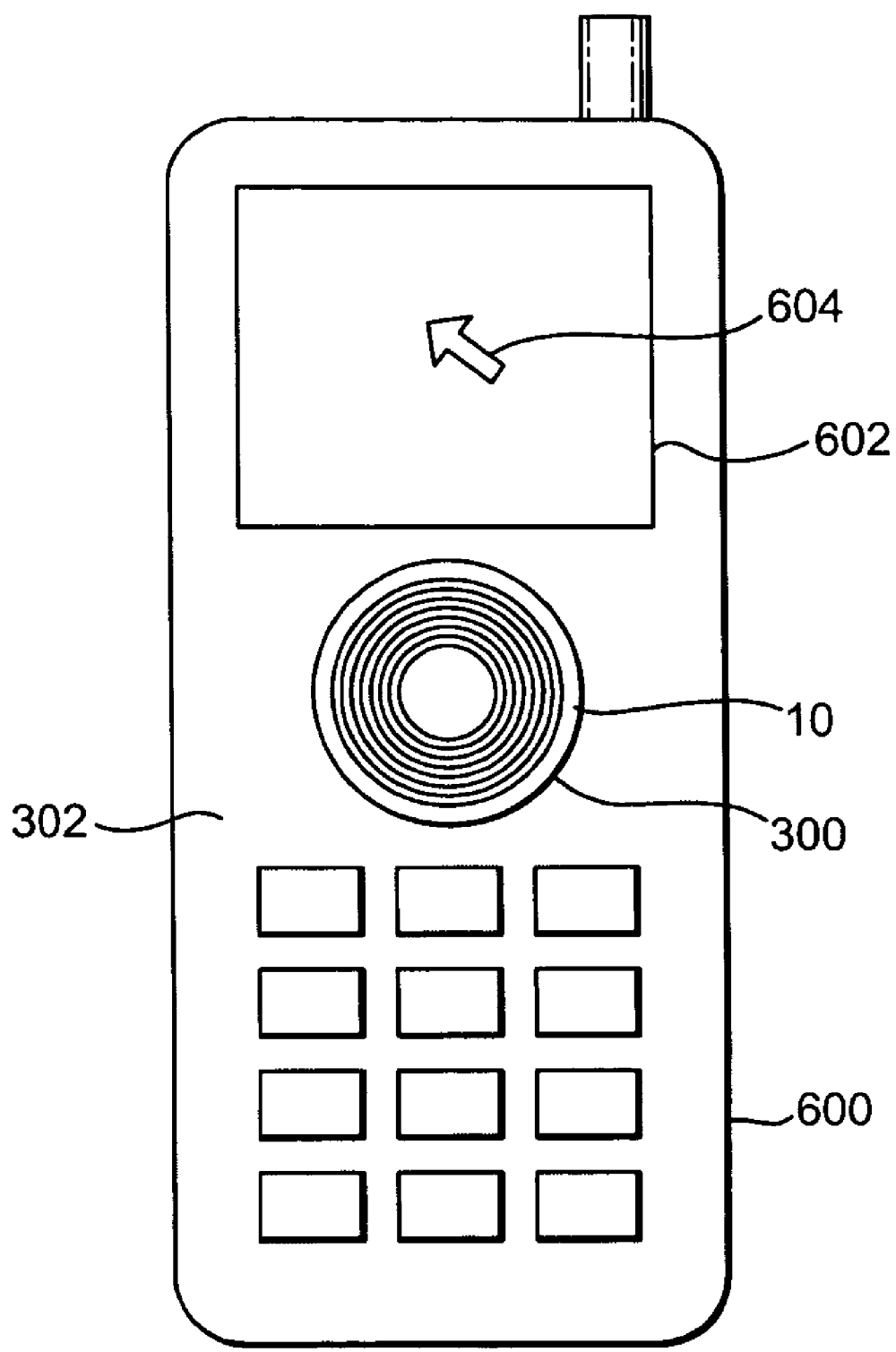
FIG. 5 is a schematic diagram illustrating one embodiment of a host that includes a slide pad system with a slide pad membrane.

FIG. 5 is a schematic diagram illustrating one embodiment of a host 600 that includes slide pad system 300 with slide pad membrane 10 housed in case 302. In the embodiment of FIG. 5, host 600 comprises a cellular or mobile telephone that includes display 602 for displaying a pointer 604. A user of host 600 moves pointer 604 in display 602 using slide pad membrane 10 of slide pad system 300. In other embodiments, host 600 comprises an electronic device configured to perform other functions.

Various modifications and additional features of slide pad system 300 will now be described with reference to other embodiments.

In other embodiments, a button cap or cover (not shown) may be attached to a top surface of disk portion 120 to provide mechanical actuation, labeling, and/or other decorative functions.

In other embodiments, button 308 and/or switch 310 may be integrally formed with disk portion 120 of slide pad membrane 10.

In other embodiments, button 308 and/or switch 310 may be integrally formed.

In other embodiments, an O-ring or other sealing element may be included to allow fluid to be sealed in slide pad system 300. The fluid may be used to provide lubrication, as well as a retaining force from surface tension to keep button 308 and flex circuit 316 in close contact with substrate 322.

In other embodiments, slide pad membrane 10 may include an additional overmolded layer, e.g., hard plastic. The overmolded layer may include button 308.

In other embodiments, slide pad membrane 10 may be made electrically conductive.

In other embodiments, slide pad system 300 includes one or more lighting elements, e.g., an LED, configured to transmit light through slide pad membrane 10.

In other embodiments, slide pad membrane 10 may include an additional matte finish layer to increase the surface friction of one or more surfaces of slide pad membrane 10.

In other embodiments, slide pad membrane 10 may be integrally formed as part of a keypad or other functional membrane of a host.

In other embodiments, slide pad membrane 10 may include a pigment, dye, molded graphical or text images (e.g., logos or other information), or colored or clear particles of various shapes and sizes as functional or decorative elements.

In other embodiments, disk portion 120 may be separately formed from slide pad membrane 10 such that slide pad membrane 10 fits around or engages disk portion 120. For example, slide pad membrane 10 may form a hole in place of disk portion 120 to allow a hard button to be snapped through slide pad membrane 10 and into guide ring 306.

In other embodiments, annular ripples portion 110 or disk portion 120 of slide pad membrane 10 may include dimples, depressions, perforations, raised portions, or other textural elements to alter the spring constant of annular ripples portion 110 or the touch and feel of disk portion 120.

In other embodiments, annular ring portion 100, annular ripples portion 110, and/or disk portion 120 of slide pad membrane 10 may be formed with a double molding process to produce different material compositions at different radial positions of slide pad membrane 10 to optimize movement or mechanical durability.

In other embodiments, slide pad membrane 10 may be formed with a v-shaped cross-section where disk portion 120 is lower than annular ring portion 100 to create a pre-load on plate 306 in the z direction, pressing it flat against substrate 330 and resisting lifting of membrane 10 by sticking to the user's finger.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A slide pad membrane comprising:
an annular ring having an inner edge;
a center portion having an outer edge; and
a plurality of concentric annular ripples including an outer annular ripple connected to the inner edge of the annular ring and an inner annular ripple connected to the outer edge of the center portion, wherein the plurality of concentric annular ripples is configured to allow the center portion to move in a direction toward the annular ring and wherein the plurality of concentric annular ripples forms a radial spring to bias the center portion toward a center of the annular ring.

2. The slide pad membrane of claim 1 wherein the plurality of concentric annular ripples is configured to allow the center portion to move in a direction orthogonal to a plane that includes the annular ring.

3. The slide pad membrane of claim 1 wherein the annular ring, the center portion, and the plurality of concentric annular ripples are integrally formed.

4. The slide pad membrane of claim 1 wherein the annular ring, the center portion, and the plurality of concentric annular ripples have a substantially uniform composition.

5. The slide pad membrane of claim 1 wherein the annular ring includes an O-ring configured to interface with a case portion.

6. The slide pad membrane of claim 1 wherein the center portion is substantially circular.

7. The slide pad membrane of claim 1 wherein the center portion of the slide pad membrane forms a cavity for interfacing a button.

8. The slide pad membrane of claim 1 wherein the center portion of the slide pad membrane forms a cavity for interfacing a guide structure.

9. The slide pad membrane of claim 1 wherein each of the plurality of concentric annular ripples has a cross-section that is one of substantially sinusoidal, substantially triangular, and substantially square.

10. A slide pad system comprising:
a printed circuit board;
a button; and
a slide pad membrane including an annular ring having an inner edge, a center portion having an outer edge, and a plurality of concentric annular ripples including an outer annular ripple connected to the inner edge of the annular ring and an inner annular ripple connected to the outer edge of the center portion;
wherein the center portion of the slide pad membrane forms a first cavity that includes the button and is configured to move the button relative to the printed circuit board; and
wherein the plurality of concentric annular ripples is configured to allow the center portion to move in a direction toward the annular ring and wherein the plurality of concentric annular ripples forms a radial spring to bias the center portion toward a center of the annular ring.

11. The system of claim 10 further comprising:
a guide ring that forms a second cavity that includes the button;
wherein the first cavity includes the guide ring.

12. The system of claim 11 further comprising:
a dome switch that interfaces with the button.

13. The system of claim 11 further comprising:
a spring attached to the guide ring.

14. The system of claim 13 further comprising:
an electrical connection between the printed circuit board and the spring.

15. The system of claim 11 wherein the printed circuit board includes control circuitry configured to control a pointer in a display in response to motion of the button relative to the printed circuit board.

16. An apparatus comprising:
a slide pad membrane including an annular ring having an inner edge configured to interface with the case, a center portion having an outer edge, and a plurality of concentric annular ripples including an outer annular ripple connected to the inner edge of the annular ring and an inner annular ripple connected to the outer edge of the center portion, wherein the plurality of concentric annular ripples is configured to allow the center portion to move in a direction toward the annular ring and wherein the plurality of concentric annular ripples forms a radial spring to bias the center portion toward a center of the annular ring; and
a case configured to house the slide pad membrane, wherein the case is configured to interface with the annular ring.

17. The apparatus of claim 16 further comprising:
a display device housed in the case and configured to display a pointer;
a slide pad system that includes the slide pad membrane and configured to cause the pointer to move within the display device in response to the center portion being moved in a direction toward the annular ring.

18. The apparatus of claim 16 wherein the case is configured to secure the annular ring to allow the center portion to move in a direction toward the annular ring.

19. The slide pad membrane of claim 1 wherein the radial spring is radially symmetric.

* * * * *